(No Model.)

F. MELKERSMAN.
GRAIN SEPARATOR.

No. 384,861. Patented June 19, 1888.

WITNESSES.
H. C. Newman
C. M. Newman

INVENTOR.
Frederick Melkersman
By his Attorneys
Baldwin Hopkins & Peyton

UNITED STATES PATENT OFFICE.

FREDRICK MELKERSMAN, OF ST. CHARLES, MISSOURI.

GRAIN-SEPARATOR.

SPECIFICATION forming part of Letters Patent No. 384,861, dated June 19, 1888.

Original application filed July 16, 1887, Serial No. 244,528. Divided and this application filed December 19, 1887. Serial No. 258,336. (No model.)

*To all whom it may concern:*

Be it known that I, FREDRICK MELKERSMAN, a citizen of the United States, residing at St. Charles, county of St. Charles, and State of Missouri, have invented certain new and useful Improvements in Grain-Separators, of which the following is a specification.

It is well known that grain, especially oats, varies somewhat in size and quality. It is also well known that it is almost impossible to separate all impurities—such as grains of sand, cockle, &c.—from the good grain, and that some hulls are not removed by the ordinary hulling-machine.

My invention is designed to separate the good grain from the imperfect grain and from the impurities above mentioned, and to dissolve and separate fine impure matter ordinarily adhering to the grain.

To this end my invention consists of an apparatus which receives the grain from a hulling-machine, carries off separately the imperfect grain and the impurities, and separates the good grain and delivers it separately for further treatment.

Figure 1:
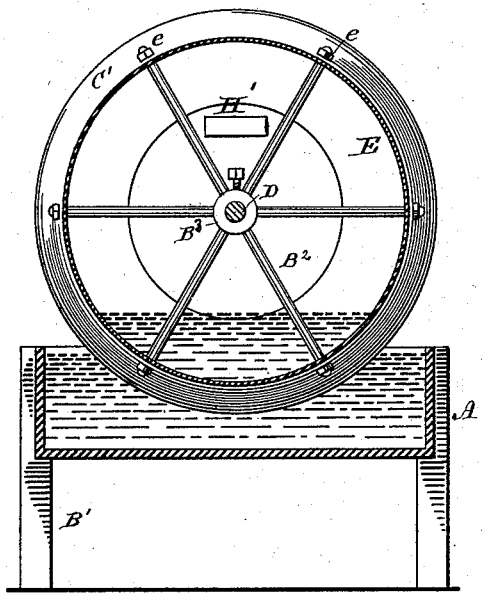
Figure 2:
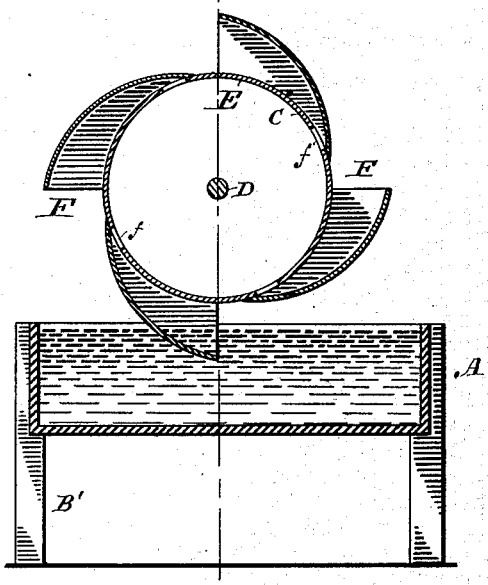
Figure 3:
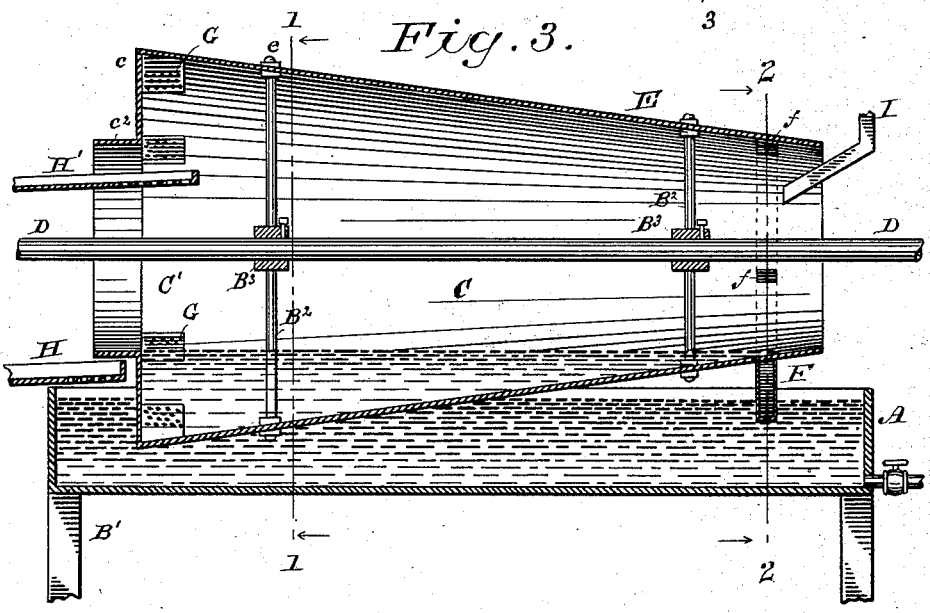

In the accompanying drawings, Figure 1 is a cross-section of my improved apparatus, taken on the line 1 1 of Fig. 3. Fig. 2 is a cross-section on the line 2 2 of Fig. 3, and Fig. 3 is a longitudinal section on the line 3 3 of Fig. 2.

A trough, A, is mounted on suitable standards, B', and is supplied with water from any suitable source. A conical drum, C, is mounted on suitable bearings, and its larger end, C', extends into the trough below the water-line, as shown. The driving-shaft D of the drum carries hubs $B^3$, to which are secured the spokes $B^2$, that form supports or stays for the sheet-metal casing E. The sheet-metal casing is shaped like the frustum of a cone, and is secured to the spokes by clamping-nuts $e$, or by any other suitable devices.

On the smaller end of the drum are arranged one or more series of buckets, F, as shown in Figs. 2 and 3, which take the water from the trough and deliver it through openings $f$ (shown in Fig. 2) into the drum. The larger end of the drum is provided with an annular rim, $C^2$, preferably flanged at $c$, so as to partially close the drum. Contiguous to the rim are arranged a series of blades or wings, G, suitably inclined and arranged in such proximity to each other as to form a series of buckets. The wings are perforated for about two-thirds of their length from their outer ends inwardly toward the casing of the drum. Below the flange $c$ is arranged a perforated table, H, to which some of the grain is delivered over the flange. A similar table, H', is arranged above the table H, and extends within the flange and a sufficient distance within the drum to project beyond the series of buckets G. These tables are slightly inclined, as shown, so that the grain delivered to them may be carried away from the machine and delivered to any suitable receptacle. The tables may be vibrated to facilitate the discharge of the grain and the draining of the water through the perforated bottoms.

The grain is delivered to the apparatus through a chute, I, at the smaller end of the drum and a short distance within it. It first falls on the water in the drum. The heavy grain sinks to the bottom and finds its way down the inclined surface of the drum to the buckets G. The imperfect grain and impure matter floats on the top of the water from the smaller end of the drum to the larger end and floats over the rim $c$ onto the perforated table H, which strains it and delivers it to a suitable receptacle. The heavy or good grain which finds its way to the buckets is elevated and delivered to the upper inclined table, H', which in like manner strains the water from the grain and delivers it (*i. e.*, the grain) to a separate receptacle. The drum is rotated just fast enough to pick up and discharge the good grain as it accumulates and to permit the bad grain and impurities to flow over the rim $c$ and be discharged to a separate receptacle. The water in the trough and in the cylinder is kept at a uniform level in any suitable way, and the temperature may be regulated to accommodate the character of the grain.

The trough may be emptied by means of a cock, J, which may also be used to regulate the height of water in the trough.

This application is a division of an application filed by me July 16, 1887, serially numbered 244,528. Any patentable matter shown in said application and not herein claimed is disclaimed in favor of said application and other divisions thereof.

I claim as of my own invention—

1. In a machine for washing and separating grain, the combination, substantially as hereinbefore set forth, of the water-trough, the conical drum contained therein, a chute for delivering the grain to the interior of the drum at its smaller end, the buckets on the smaller end of the drum for delivering water to the interior thereof, and the buckets on the larger end of the drum and within the same for elevating and delivering the good grain from the drum.

2. In a machine for washing and separating grain, the combination, substantially as hereinbefore set forth, of the water-trough, the conical drum mounted therein, a chute for delivering the grain to the interior of the drum at its smaller end, the buckets on the smaller end of the drum for delivering water to the interior thereof, the buckets on the larger end of the drum and within the same for elevating and delivering the good grain, the inclined perforated table extending into the larger end of the drum to receive the grain from the buckets, and the inclined perforated table for receiving the overflow from the drum.

3. The combination, substantially as hereinbefore set forth, of the water-trough, the conical drum mounted therein with its smaller end above the water-level and its larger end below said level, the buckets on the smaller end of the drum for delivering water to the interior thereof, the flange at the larger end of the drum, the buckets arranged within the drum adjacent to the flange for elevating and delivering the grain, the overflow-rim on the edge of the flange, the table extending within the rim under the lifting-buckets to receive the good grain, and the table below the rim to receive the overflow of water and imperfect grain.

In testimony whereof I have hereunto subscribed my name.

FREDRICK MELKERSMAN.

Witnesses:
S. H. MERTEN,
GUSTAVE HACKMANN.